United States Patent
Kleinlogel et al.

(10) Patent No.: US 6,709,628 B2
(45) Date of Patent: Mar. 23, 2004

(54) PROCESS FOR THE PRODUCTION OF SINTERED CERAMIC OXIDE

(75) Inventors: Christoph Kleinlogel, Zurich (CH); Martin Goedickemeier, Gais (CH); Ludwig Gauckler, Schaffhausen (CH)

(73) Assignee: Eidgenossische Technische Hochschule Zurich Nichtmetallische Werkstoffe (CH)

( * ) Notice: Subject to any disclaimer, the term of this patent is extended or adjusted under 35 U.S.C. 154(b) by 0 days.

(21) Appl. No.: 09/764,031

(22) Filed: Jan. 17, 2001

(65) Prior Publication Data

US 2001/0007381 A1 Jul. 12, 2001

(51) Int. Cl.$^7$ .............................................. C04B 33/32
(52) U.S. Cl. .................... 264/661; 264/681; 501/152
(58) Field of Search .......................... 264/681, 661; 501/152

(56) References Cited

U.S. PATENT DOCUMENTS 5,665,482 A * 9/1997 Mori .......................... 501/152

FOREIGN PATENT DOCUMENTS

WO          91/09430          6/1991

OTHER PUBLICATIONS

Solid State Ionics, Bd. 106, Nr. 3–4, Feb. 1, 1998, pp. 263–268—Title: Sintering Behaviors of Ceria and Gadolinia–Doped Ceria, By Hideaki Inabe et al.

Journal of the European Ceramic Society, Bd. 16, Nr. 9, 1996, pp. 961–973—Title: Sintering Behaviour and Ionic Conductivity of Yttria–Doped Ceria, By Jan Van Herle et al.

Journal of the American Ceramic Society, Bd. 65, No. 12, Dec. 1982—Title: Properties of the Solid Electrolyte Gadolinia–Doped Ceria Prpared By Thermal Decomposition of Mixed Cerium–Gadolinium Oxalate, By A. Overs et al.

Journal of the European Ceramic Society, Bd. 15, Nr. 10, Jan. 1, 1995—Title: Effect of Solid Solution Additives on the Sintering of Ultra–Fine CeO Powders, By M.N. Rahaman et al.

* cited by examiner

Primary Examiner—Christopher A. Fiorilla
(74) Attorney, Agent, or Firm—Bachman & LaPointe, P.C.

(57) ABSTRACT

The invention relates to a process for production of a sintered oxide ceramic of composition $Ce_xM_yD_zO_{2-a}$ with dense structure without open porosity or with a predetermined porosity. The first doping element M is at least one element of the group consisting of the rare earths but M≠Ce, alkali and earth alkali metals. The educts are used with a second doping element D of at least one metal of the group consisting of Cu, Co, Fe, Ni and Mn, in the submicron particle size or as a salt solution, and sintered at a temperature in the range of 750–1250° C. into an oxide ceramic with extremely fine structure of a grain size of maximum around 0.5 μm.

16 Claims, 4 Drawing Sheets

PROCESS FOR THE PRODUCTION OF SINTERED CERAMIC OXIDE

Figure 1:
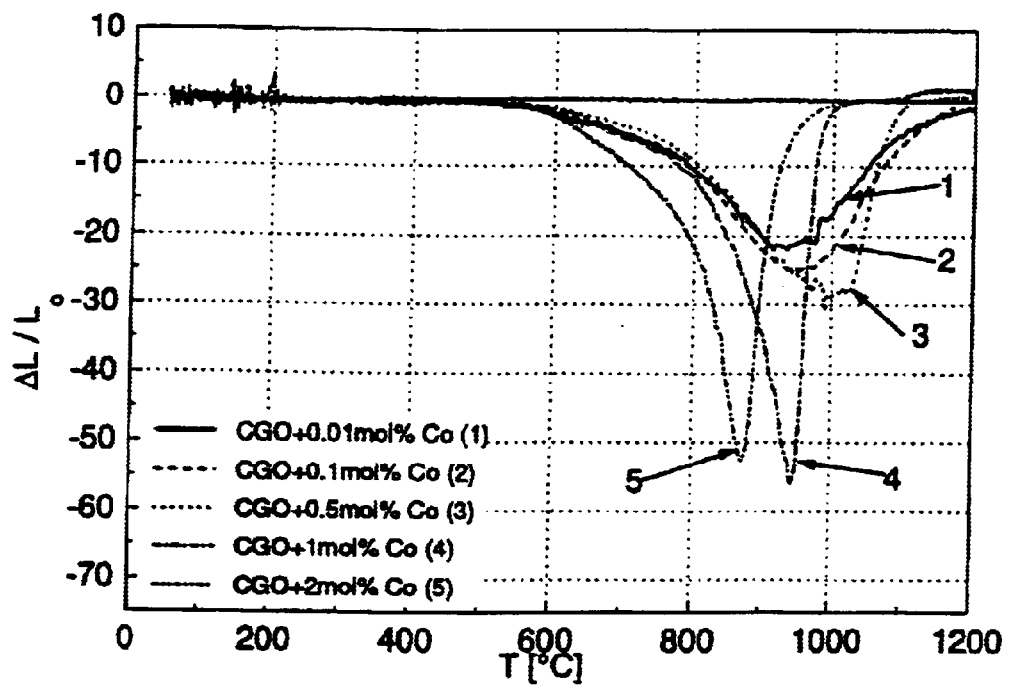

The invention relates to a process for production of a sintered oxide ceramic of composition $Ce_xM_yD_zO_{2-a}$ with dense structure without open porosity or with a predetermined porosity, where a first doping element M is used from at least one element of the group consisting of the rare earths but M≠Ce, alkali and earth alkali metals, and a second doping element D of at least one metal but D≠M.

It is known to produce ceramics based on ceroxide ($Ce_{2x}O$) by means of various processes. Such processes are for example film casting or pressing with subsequent sintering at temperatures of 1300–1650° C. Such high sintering temperatures are necessary to obtain a dense structure without open porosity and a high strength. However these high temperatures lead to a grain size in the structure of the order of several micrometers ($\mu$m). As the grain size increases the mechanical properties of the ceramic deteriorate. The production and use of ceramics based on $CeO_2$ is known from several points of literature, for example from Solid State Ionics, Vol. 36, 71–75 (1989).

WO, A 91/09430 describes a solid electrolyte composition based on ceroxide, a fuel cell and a process for generating electricity with this cell. The ceroxide ceramic contains a first doping element M selected from the group consisting of Pr, Nd, Pm, Sm, Eu, Gd, Tb, Dy, Ho, Er, Tm, Yb, Lu, Sc, Y, La and Ca, and a second doping element D from the group consisting of Pr, Sm, Eu, Tb, Fe, Co and Ni where M≠D.

The first doping element M in WO, A 91/09430 is used to increase the ion conductivity, the second doping element D to reduce the electron conductivity of the composition under reducing conditions. The solid electrolyte is produced in the conventional way by means of pressing and sintering at temperatures in the range from 1300–1525° C. No statements are made concerning the microstructure or grain size, but because of the parameters given, however, these must lie in the range of several micrometers.

Furthermore EP,A1 0722194 discloses the composition of a solid body electrolyte with defective fluorite structure for fuel cells based on ceroxide. A first doping element M is selected from the group consisting of Lu, Yb, Tm, Er, Y, Ho, Dy, Gd, Eu, Sm and Nd. Further doping elements A and B are alkali and earth alkali metals. The ceroxide composite materials described here have a lower electronic conductivity than conventional ceroxide electrolyte materials. The solid electrolyte is produced by pressing and sintering which is carried out at the usual high temperatures. A sintering process at 1500° C. for four hours under atmospheric conditions is mentioned in order to obtain a sintered body with a cubic monophase fluorite structure. No statements are made on the microstructure or grain size, but because of the parameters given, however, a grain size of several micrometers can be assumed.

The inventors have faced the task of creating a process for production of a sintered oxide ceramic of the type described initially with which the sinter behaviour of $CeO_2$-based ceramics can be influenced such that an extremely fine structure in the submicron range can be achieved with correspondingly good mechanical properties of the material. The electrical properties, i.e. the ion and electron conductivity, should remain unchanged despite the low grain size.

The task is solved according to the invention in that to the educt is added a second doping element D from at least one metal of the group consisting of Cu, Co, Ni, Fe and Mn, in the submicron particle size or as a salt solution, and sintered at a temperature of 750–1250° C. into an oxide ceramic with extremely fine structure of a grain size of maximum around 0.5 $\mu$m. Special and further developed embodiments of the process are the subject of dependent claims.

The first doping element M is added in order to obtain certain electrochemical properties for the proposed area of application, for example a specific oxygen ion conductivity. Common first doping elements M are known from the literature, in particular the rare earths such as La, Pr, Nd, Pm, Sm, Eu, Gd, Tb, Dy, Ho, Er, Tm, Yb and Lu, the alkali metals Ca, Sr and Ba and the earth alkali metals Sc, Y and Ga. These elements are used individually or in combinations of several elements.

For the process according to the invention commercial ceroxide can be used which already contains a corresponding mol fraction y of the first doping element M, which is advantageous in particular for routine applications. It is of essential importance that the powder is present in a particle size in the submicron range or is brought into this range. This can be achieved before or after addition of the second doping element D depending on the grain size of these components.

Evidently, for performance of the process according to the invention the individual components can also be used. Suitable starting materials, also known as educts, are in particular oxides of the components. These are ground dry and wet, then sintered. When inorganic salts are used as starting elements, wet chemical methods can be applied followed by coprecipitation, filtering and sintering.

The mol fraction x for the basic component Ce lies in the range of around 0.5 to around 1. The first doping element M is added in a mol fraction y of $0 \leq y \leq 0.5$. In the limit case the first doping element M can even be omitted. The mol fraction z for the second doping element D lies in the range of $0 \leq z \leq 0.05$. In particular the mol fraction z for the second doping element D, which is not optional like the first doping element M, lies in the range from $0.001 \leq z \leq 0.02$. Compared with the first doping element M, the doping range for the second doping element D is very narrow and close to 0.

In any case the particle size of the components used as educts for the oxide ceramic lies in the submicron range, suitably clearly below 1 $\mu$m. This applies even though the expert knows that a certain proportion of coarser particles facilitates the handling of the powder. The preferred mean particle size of all components of the starting powder is below 0.1 $\mu$m, in particular in the range from 0.01 to 0.05 $\mu$m.

The sintering temperatures preferably lie in the range from 800 to 1200° C., in particular 850–1100® C. Suitably a heating rate in the range of 0.5–20, preferably 1–10° C./min is used. These sintering temperatures lie clearly below the previously conventional, even deemed necessary, temperature range above 1300° C.

Depending on the required properties of the sintered ceramic, the sintering process is continued in a first variant until at least 98% of the theoretically achievable density is achieved. The sintering process according to the invention can however simply be continued within economic limits until at least 99% of the theoretically achievable density is achieved or even exceeded. The necessary process parameters are determined theoretically or empirically.

In a further variant of the process according to the invention porous sintered ceramics can also be produced. For a given porosity, for example 80% of the theoretically achievable density, the continuous temperature rise is interrupted at a temperature determined again theoretically or empirically and the sinter process terminated.

According to all variants the sinter temperature is preferably lowered again, for example by cooling, not immediately after reaching the end temperature but held at the predetermined optimum final temperature for a certain holding period. This holding time is preferably at least 0.25 h, in particular 1 to 2 h.

The advantages of the process according to the invention can be summarised briefly as follows:

Depending on the process parameters, a sintered oxide ceramic can be produced in dense structure without open porosity with more than around 98%, if necessary also more than around 99% of the theoretically achievable density. Premature interruption of the temperature rise during the sintering process can also lead to a porous structure with a specified lower density.

The sintered oxide ceramic has an extremely fine structure with a grain size of maximum around 0.5 $\mu$m, preferably maximum around 0.1 $\mu$m, whereby a material with better mechanical properties can be produced.

Due to the low sintering temperatures, the sintering process entails lower energy and investment costs.

The electrical properties with regard to the ion and electron conductivity remain good and unchanged.

The application possibilities of the ceramics produced according to the invention are correspondingly versatile, for example as electrolytes, electrodes, sensors and insulation materials.

Figure 2:
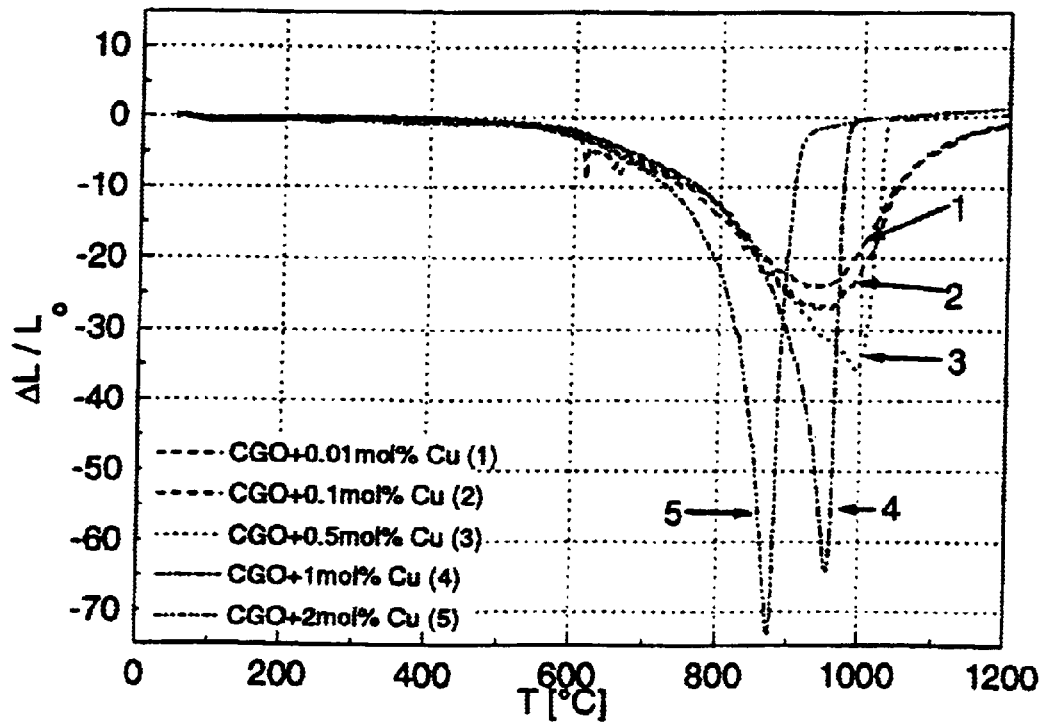
Figure 3:
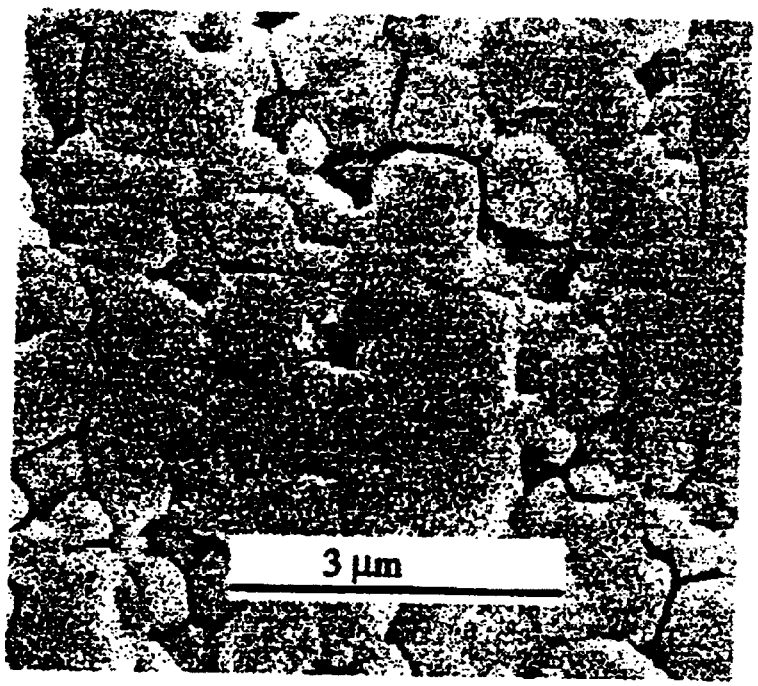
Figure 4:
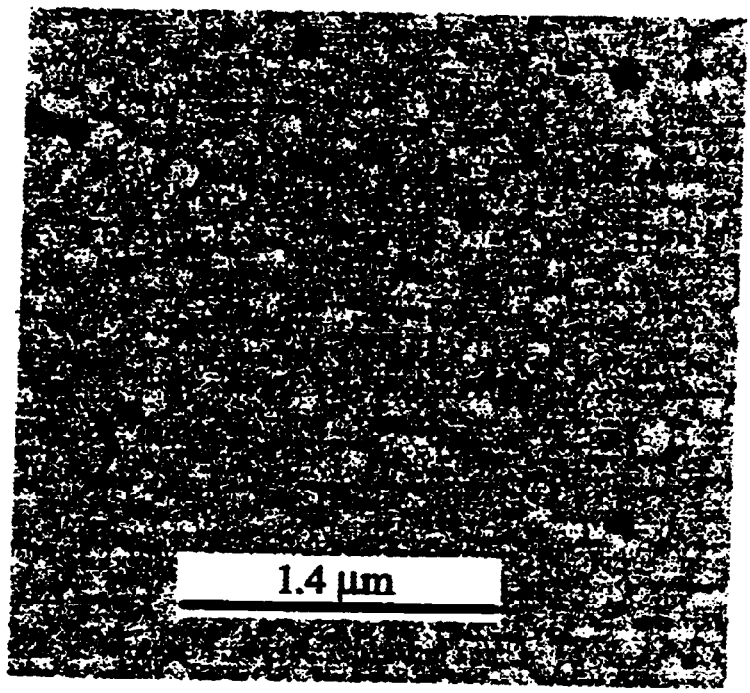
Figure 5:
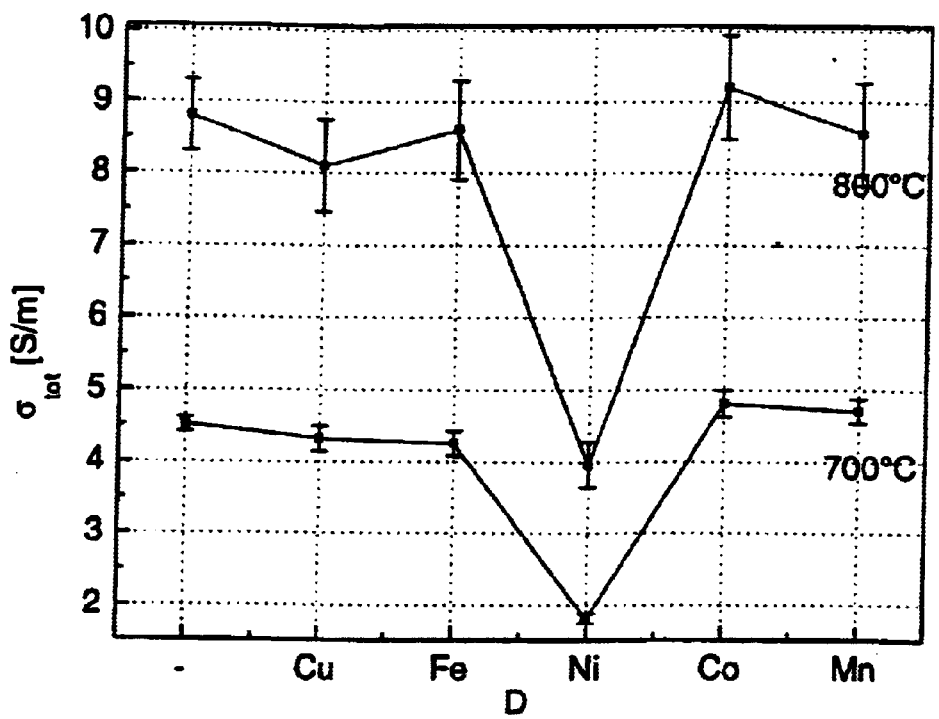
Figure 6:
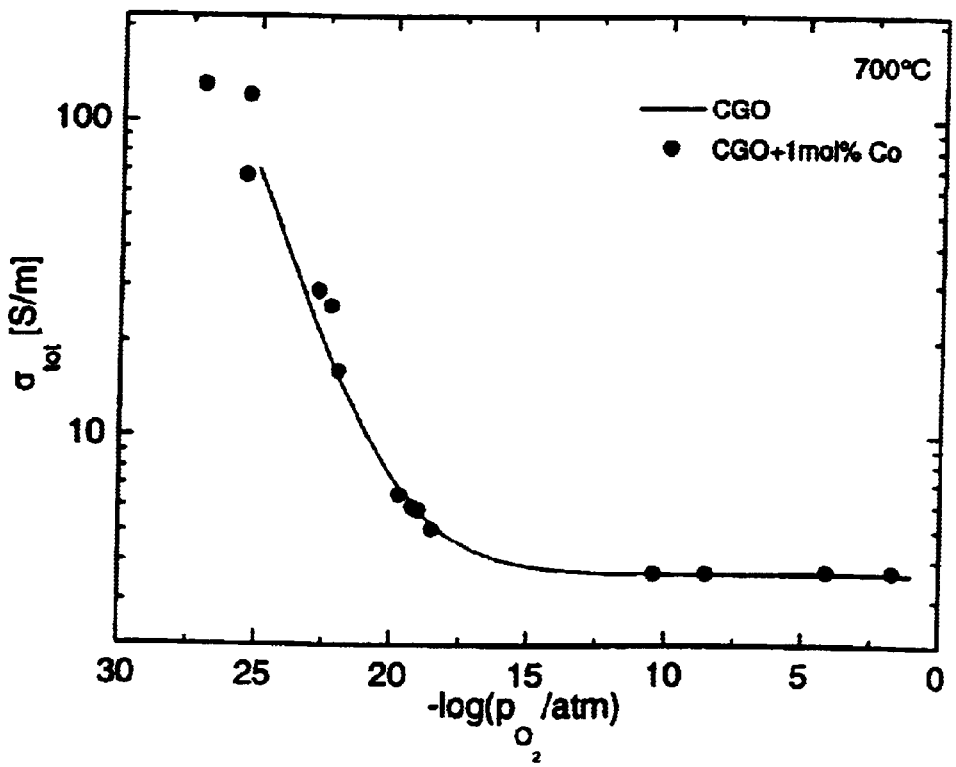
Figure 7:
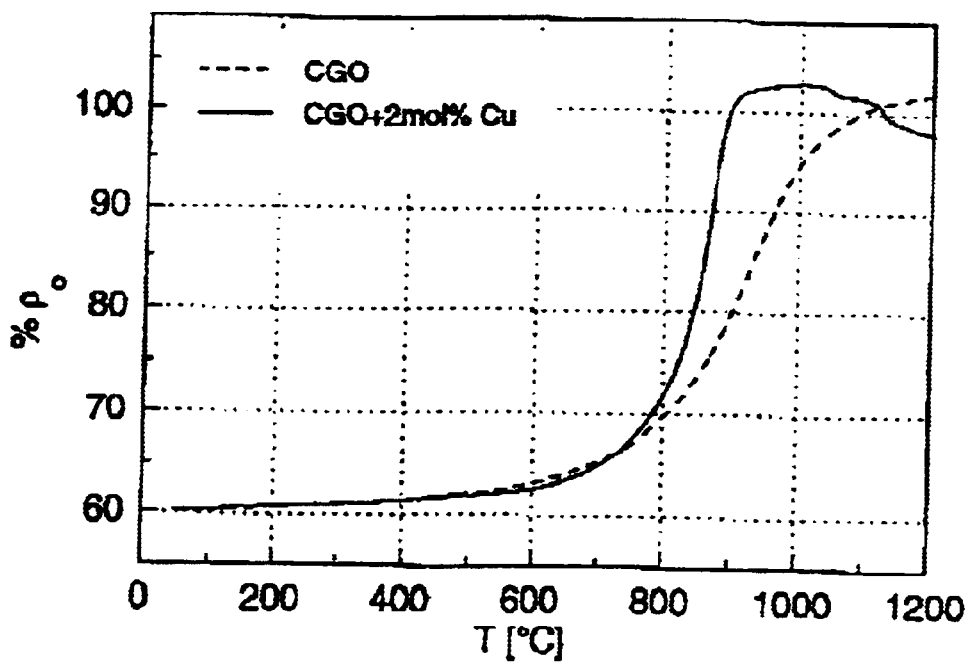
Figure 8:
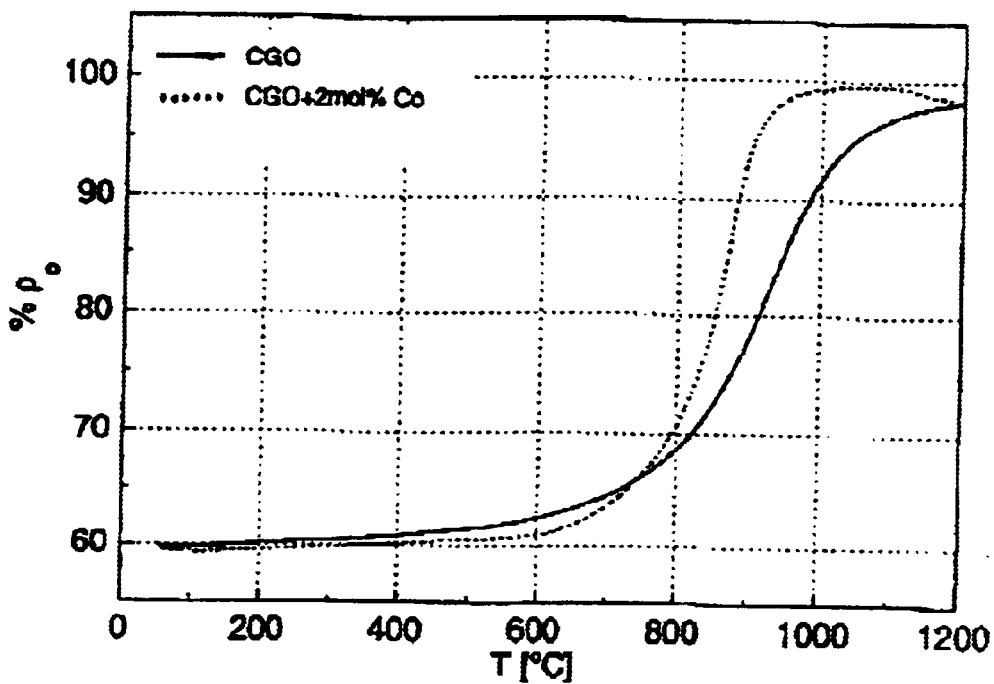

The invention is explained in more detail using the diagrams and graphs shown in the drawings. These show diagrammatically:

FIG. 1 a sinter rate $\Delta L/L_0$ as a function of temperature T for $Ce_{0.8}Gd_{0.2}Co_zO_{2-a}$ FIG. 2 a sinter rate $\Delta L/L_0$ as a function of temperature T for $Ce_{0.8}Gd_{0.2}Cu_zO_{2-a}$, FIG. 3 a microstructure of $Ce_{0.8}Gd_{0.2}O_{2-a}$ according to the state of the art;

FIG. 4 a microstructure of $Ce_{0.8}Gd_{0.2}Co_1O_{2-a}$ according to FIG. 1,

FIG. 5 the electrical conductivity of $Ce_{0.8}Gd_{0.2}D_1O_{2-a}$,

FIG. 6 the total electrical conductivity of ceroxide ceramics as a function of the oxygen partial pressure, FIG. 7 a density change of ceroxide ceramics at a constant heating rate, and FIG. 8 a variant of FIG. 7.

FIGS. 1 and 2 show a sinter rate $\Delta L/L_0$ for $Ce_{0.8}Gd_{0.2}O_{2-a}$, referred to below as CGO, with a second doping element D added in variable quantities. Sintering takes place at a constant heating rate. According to FIG. 1 cobalt Co, and according to FIG. 2 copper Cu, is added as a second doping material. The doping quantity is given in mol %, where 0.01 mol % corresponds to a mol fraction z of 0.0001, to 2 mol % a mol fraction z of 0.02.

Curves 1 to 5 follow similar trends with the two doping elements Co (FIG. 1) and Cu (FIG. 2).

Curve 1 which shows the sinter rate of CGO with 0.01 mol % D has a corresponding sinter rate over a broad temperature range with a slight maximum in the area of around 930° C. as a peak. The maximum sinter rate, at a heating rate of 5° C./min and a basic density of around 62%, is only just above −20 $\Delta L/L_0$. Curves 2 and 3 which show the temperature-dependent sinter rate of CGO with 0.1 and 0.5 mol % D respectively essentially correspond to curve 1 but show a slightly higher sinter rate $\Delta L/L_0$ with a peak shifted towards a higher temperature at around 1000° C. In the case of Co as a second doping element D (FIG. 1), the peak in curve 2 lies in the area of −25, and in curve 3 around −30. If D=Cu (FIG. 2) the peak of curve 2 lies below 0.25, in curve 3 around −30 and is shifted towards clearly higher temperatures, namely 950 (curve 2) and 1000° C. (curve 3).

Curves 4 and 5 for the temperature-dependent sinter rate with 1 mol % D and 2 mol % D show a significant difference in development in relation to curves 1 to 3. They extend over a far narrower temperature range and for $\Delta L/L_0$ reach values in the range from −50 to −75 and their peak, i.e. the maximum sinter rate, lies at clearly lower temperatures of 930 (curve 4) and 850–870° C. (curve 5).

FIGS. 1 and 2 show that with the addition of a small quantity of Co or Cu, a clear reduction of the sintering temperature can be achieved with a clear maximum for the sintering rate in the range of 850–1000, in particular around 900° C.

FIG. 3 shows a coarse-grained microstructure of CGO without the addition of the second doping element D, sintered at around 1450° C., with the holding time of 2 h. The grain sizes lies in the area of 1 $\mu$m, partly substantially above this, partly clearly below this, thus giving a broad grain size distribution in the range from 0.4–3 $\mu$m and a relative density of around 90%. This broad variation spectrum for the grain size has a disadvantageous effect on the mechanical stability. FIG. 3 documents the usual state of the art.

FIG. 4 shows a microstructure of CGO according to the invention doped with 1 mol % Co, sintered at 900° C. with a holding time of 2 h. The grain size is around 0.1 $\mu$m, the density more than 98% of the theoretical possible density. This leads to an extraordinarily high mechanical stability.

FIG. 5 shows the total electrical conductivity $\sigma_{tot}$ [S/m], i.e. the sum of the ion and electron conductivity, at 700 and 800° C. On the abscissa at the far left are the comparison values for pure CGO, then successively those of Cu, Fe, Ni, Co and Mn, where the concentration of the second doping element D is in each case 1 mol %. The electrical conductivity, with the exception of the oxide ceramic with the second doping element nickel, always lies in the same order of magnitude. The conductivity climbs without exception with the rising temperature. The doped ceroxide ceramics are each sintered at 900° C., pure CGO at 1450° C.

FIG. 6 shows the dependence of the total electrical conductivity $\sigma_{tot}$ [S/m] as a function of the oxygen partial pressure at a temperature of 700° C. The abscissa shows −log ($p_{O2}$/atm), and the ordinate the total electrical conductivity in logarithmic scale. The curve for pure CGO sintered at around 1450° C. and CGO sintered at 900° C. with 1 mol % Co run practically identically.

FIGS. 7 and 8 show a density change at a constant heating rate of around 10° C./min for pure CGO as a comparison example and CGO doped with 2 mol % Cu (FIG. 7) or Co (FIG. 8) as component D. The abscissa shows the temperature T[° C.] and the ordinate the density in %$\rho_o$ with 100% as the theoretically possible density. FIGS. 7 and 8 show an essentially faster rise in the density change curve for the CGO doped with component D at around 750° C. With the addition of 2 mol % Cu the theoretically possible density of 100% is practically reached at just 900° C., and with doping with 2 mol % Co at around 950° C. In both cases however the significantly lower sintering temperature of CGO doped with a second doping element D (Cu, Co) is unmistakable.

EXAMPLE 1

Specimens were produced on the basis of $CeO_2$ in the process according to the invention. On a first specimen the doping of CGO with 1 mol % copper (second doping element D) is described in detail. For specimens 2–5 with other second doping element D the procedure was similar.

2.778 g $Cu(NO_3)_2 \cdot 3H_2O$ copper nitrate was completely dissolved in 50 ml ethanol. 5 ml of the solution were then added to the 20 g $Ce_{0.8}Gd_{0.2}O_{2-a}$ (CGO) which was present in submicron powder form, carefully mixed in an agate mortar and dried at 120° C.

The second doping element D was added in a concentration of 2 mol %. The development of the sinter rate $\Delta L/L$ as a function of temperature T for the second doping element Co and Cu is shown as curve 5 in FIGS. 1 and 2.

The following further specimens were produced accordingly:

specimen 2: $Ce_{0.8}Gd_{0.2}O_{2-a}$+1 mol % Co, 3.346 g $Co(NO_3)_2 \cdot 6H_2O$ in 50 ml ethanol specimen 3: $Ce_{0.8}Gd_{0.2}O_{2-a}$+1 mol % Ni, 3.344 g $Ni(NO_3)_2*6H_2O$ in 50 ml ethanol specimen 4: $Ce_{0.8}Gd_{0.2}O_{2-a}$+1 mol % Fe, 4.645 g $Fe(NO_3)_3*9H_2O$ in 50 ml ethanol specimen 5: $Ce_{0.8}Gd_{0.2}O_{2-a}$+1 mol % Mn, 2.886 g $Mn(NO_3)_3*4H_2O$ in 50 ml ethanol In each case 2 g of the powder was pressed in two stages into tablets 5 mm thick and around 10 mm diameter. The uniaxial pressing took place at 50 MPa, the subsequent isostatic pressing at 300 MPa. In a dilatometer, the specimens were heated at a heating rate of 10° C./min to 1200° C. and the length change ΔL recorded.

The table below shows the sintering temperatures and the density achieved at these. The ceramic without the second doping element D serves as a comparison example which does not fall within the scope of the present invention.

| Second Doping Element D | Sintering Temperature [° C.] | Density [as % of theoretical density] |
| --- | --- | --- |
| — | 1450 | 90 |
| Cu | 900 | >99 |
| Co | 1000 | >99 |
| Fe | 1100 | >98 |
| Mn | 1100 | >98 |
| Ni | 1000 | >98 |

EXAMPLE 2

The CGO powder was mixed with the second doping element D as described under example 1. The uniaxial pressing then took place with a pressure of 40 MPa (90 kN) for 3 min. into a wafer of 60 mm diameter and approximately 2 mm thick. Sintering took place in the air on an MgO substrate at the values given in the table above and with a holding time of 2 h. The wafers were then ground and polished to a thickness of 200 μm. On both sides of the wafer were applied silver electrodes. As current collectors, platinum networks were used and for connection to a measurement unit, platinum wires. The total electrical conductivity of the individual specimens was determined with impedance spectroscopy in air at temperatures of 700 and 800° C. The results are shown in FIG. 5.

EXAMPLE 3

The total electrical conductivity of specimens produced as described under example 2 was determined with impedance spectroscopy as a function of the oxygen partial pressure. The results are shown in FIG. 6.

EXAMPLE 4

The CGO powder was mixed with 1 mol % Co as a second doping element D as described in example 1. 2 g of this powder were pressed in two stages into tablets of around 5 mm thickness and 10 mm diameter, first by uniaxial pressing at 50 MP and then by isostatic pressing at 300 MPa. The specimen was then sintered at 900° C. and polished. The microstructure is shown in FIG. 4. The difference from FIG. 3, the comparison specimen of pure CGO sintered at 1450° C., is extraordinarily clear.

What is claimed is:

1. A process for production of a sintered oxide ceramic of composition $Ce_xM_yD_zO_{2-a}$ with dense structure without open porosity or with a predetermined porosity comprising the steps of:

using a first doping element M selected from the group consisting of rear earths, but wherein M≠Ce, alkali metals, earth alkali metals, and Ga;

using an educt with a second doping element D of at least one metal, but wherein D≠M, selected from the group consisting of Cu, Co, Fe, Ni, and Mn wherein second doping element D is of submicron particle size or is a salt solution; and sintering the educts at a temperature between 750–1200° C. until a density of at least around 98% of the theoretically possible density is reached to form said oxide ceramic having a grain size no greater than 0.5 μm and wherein the mol fractions used range from $0.5 \leq x \leq 1$ for Ce, $0 \leq y \leq 0.5$ for first doping element M, and $0.0001 < z < 0.05$ for second doping element D.

2. The process according to claim 1, characterized in that first doping material M is taken from the group La, Pr, Nd, Pm, Sm, Eu, Gd, Tb, Dy, Ho, Er, Tm, Yb, Lu; Ca, Sr, Ba; Sc, Y.

3. The process according to claim 1 wherein said mol fraction of z ranges from $0.001 \leq z \leq 0.02$.

4. The process according to claim 1 wherein said educts have a mean grain size not greater than 0.1 μm.

5. The process according to claim 4 wherein said educts have a mean grain size range of 0.01–0.05 μm.

6. The process according to claim 1 wherein said sintering is performed at a temperature in the range of 800–1200°.

7. The process according to claim 1 wherein said sintering is performed at a temperature in the range of 850 to 1100° C.

8. The process according to claim 1 comprising the additional steps of:

monitoring a temperature rise of said composition;

interrupting said temperature rise at a determined temperature; and terminating the sintering.

9. The process according to claim 1 wherein sintering occurs at a heating rate in the range of 0.5–20° C./min.

10. The process according to claim 1 wherein sintering occurs at a heating rate in the range of 1–10° C./min.

11. The process according to claim 1 wherein sintering is prematurely interrupted leading to a porous structure with a specified lower density around 98%.

12. The process according to claim 1 wherein sintering continues until a density of at least around 99% of the theoretically possible density is reached.

13. The process according to claim 1 wherein said sintering comprises a holding time between 1–2 hours.

14. The process according to claim 1 wherein said sintering comprises a holding time of at least 0.25 hours.

15. The process according to claim 1 comprising the additional step of grounding said educts wet and/or dry and calcinated.

16. Process according to claim 1 characterized in that the educts are precipitated, filtered and calcinated jointly as inorganic salts.

* * * * *